A. GAILLARD.
APPARATUS FOR MAKING SULFURIC ACID.
APPLICATION FILED MAY 28, 1908.
909,578.
Patented Jan. 12, 1909.
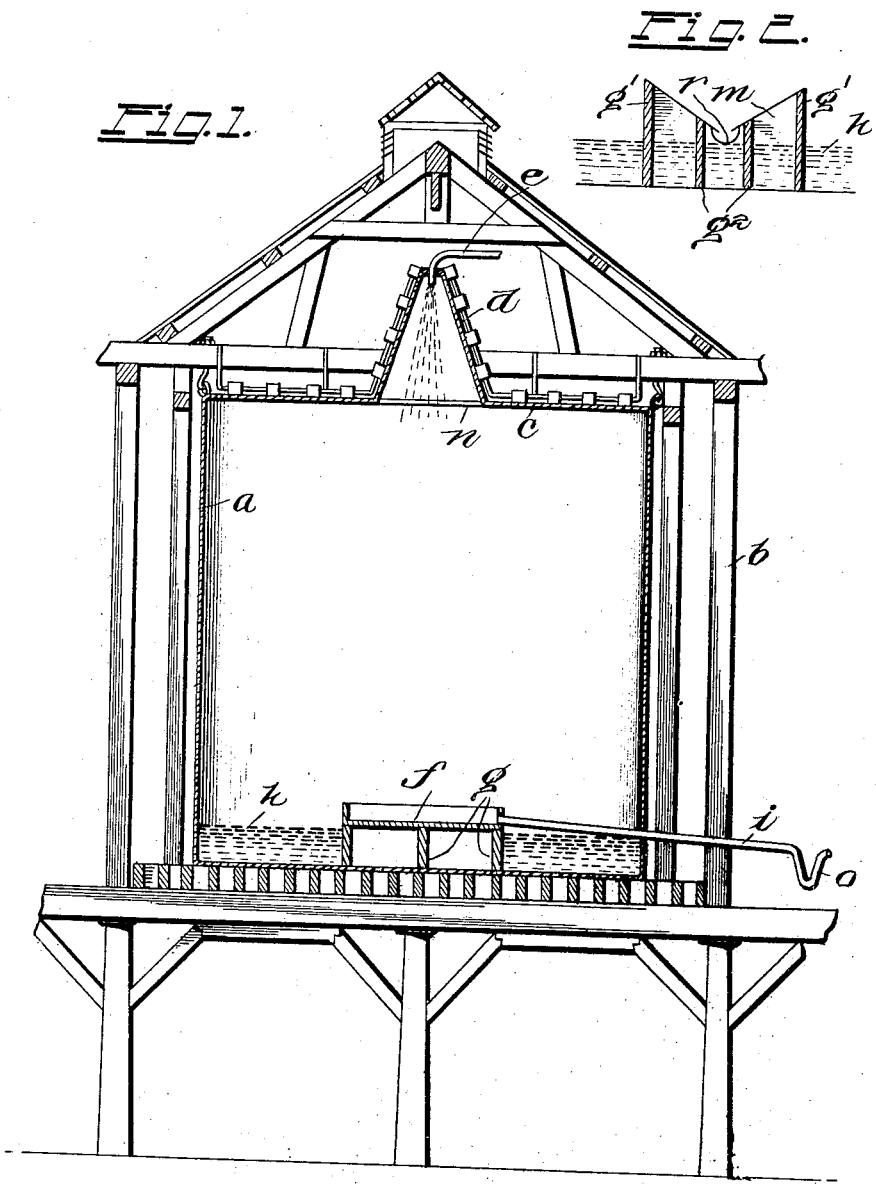

UNITED STATES PATENT OFFICE.

ANTONIO GAILLARD, OF BARCELONA, SPAIN.

APPARATUS FOR MAKING SULFURIC ACID.

No. 909,578.   Specification of Letters Patent.   Patented Jan. 12, 1909.

Application filed May 28, 1908. Serial No. 435,593.

*To all whom it may concern:*

Be it known that I, ANTONIO GAILLARD, manufacturer, a citizen of the French Republic, residing at Barcelona, in the Province of Barcelona and Kingdom of Spain, have invented certain new and useful Improvements in Apparatus for Making Sulfuric Acid; and I do hereby declare the following to be a full, clear, and exact description of the invention, such as will enable others skilled in the art to which it appertains to make and use the same.

In making sulfuric acid it has long been common to use steam in the leaden chambers. Usually several steam jets deliver into the chambers, but the production of steam adds to the expense of acid making. It has been proposed to use sprays of water instead of steam, but without entire success, chiefly owing to the fact that the chambers are not high enough, so that the atomized water was not vaporized but mixed with the acid, thereby diluting it, besides aiding in the formation of nitrous compounds which attack the lead wall of the chamber. It has been proposed to overcome these difficulties by increasing the height of the chamber, but this is open to serious objections. The cost of the chambers is greatly increased and experience has shown that they ought not to be higher than from 5-7 meters to get the best results.

According to my invention I arrange on the upper part of the leaden chamber several different cones or cylinders, into the top of each of which a water spraying nozzle delivers. The height and diameter of these cones or cylinders are so proportioned that a conical jet of atomized water is, under ordinary circumstances, entirely vaporized before reaching the bottom of the chamber, but to prevent any drops of water from mixing the acid in the bottom of the chamber, if all the water should not be converted into steam, I arrange under each atomizer a suitable water receptacle.

As hitherto used the atomizer nozzles are very liable to become useless by reason of the small openings therein being soon closed by impurities, even if filtered water is employed. Of course such nozzles could be frequently inspected and cleaned, but this is very inconvenient, so that many manufacturers have rejected the new process, or "atomized water method", and have returned to the old method of using steam. By my apparatus, however, all these difficulties are overcome, the height of the chamber is not increased and the expense of supplying steam to the chamber is obviated. Furthermore, my invention can be readily applied to the leaden chambers now in use. All that it is necessary to do is to cut circular holes in the top of the chamber and put the cones or cylinders over the openings thus made, securing said cones or cylinders to the top of the chamber by soldering or by a water seal, and then arranging the water collecting devices on the bottom of the chamber directly under the circular openings.

In the accompanying drawing:—Figure 1 is a vertical section of a framework containing a leaden chamber with my improvement attached thereto. Fig. 2 is a cross section showing a modified form of the water collecting means.

Referring to Fig. 1, $a$ represents the leaden sulfuric acid chamber supported in a suitable framework $b$. $c$ represents the top of the chamber in which are cut a number of circular holes $n$ arranged in any suitable manner, but preferably on a line passing centrally across the top of the chamber. Over each of the holes $n$ is a cone $d$ having a lead lining, the bottom of the cone being secured to the top of the leaden chamber by soldering or a water seal. Through the top of each cone passes a water atomizer $e$. Underneath the opening $n$ is arranged a water collecting device, consisting of a tank $f$, resting upon supports $g$. A pipe $i$ is connected with the tank $f$ and passes out through the wall of the chamber to deliver the surplus water. This pipe is provided with a goose neck $o$. $h$ represents the level of the acid in the bottom of the chamber. One of these tanks or receptacles $f$ may be used under each cone or the tank may run the whole length of the chamber to catch the unvaporized water from all the cones. Of course the parts $f$, $g$ and $i$ must be made of acid resisting material.

In Fig. 2 I have shown a modified form of the water collecting means. $g^1$ and $g^2$ represent two pairs of supports or legs on which are supported inclined plates $m$ which deliver into a gutter or channel $r$ which passes out through the wall of the chamber $a$.

I claim:—

1. In an apparatus for making sulfuric acid, the combination of a leaden chamber having circular holes cut in its top, cones, the lower ends of which surround said holes, a jet nozzle delivering into the top of each of said cones, and water collecting means underneath said jet nozzle, substantially as described.

2. In an apparatus for making sulfuric acid, the combination of a leaden chamber, a jet nozzle adapted to deliver atomized water through the top of said chamber, and water collecting means underneath said jet nozzle, said means being provided with a discharge device passing out through the walls of said chamber, substantially as described.

3. In an apparatus for making sulfuric acid, the combination of a leaden chamber having circular holes cut in its top, cones having their lower flaring ends surrounding said openings respectively, a jet nozzle passing inwardly through the top of each cone, and water collecting means located under said jet nozzle, said means being provided with a discharge device for the unvaporized water passing out through the wall of said chamber, substantially as described.

In testimony whereof, I affix my signature, in presence of two witnesses.

ANTONIO GAILLARD.

Witnesses:
CONSTATINO LUPER CID,
STANLEY C. HARRIS.